UNITED STATES PATENT OFFICE.

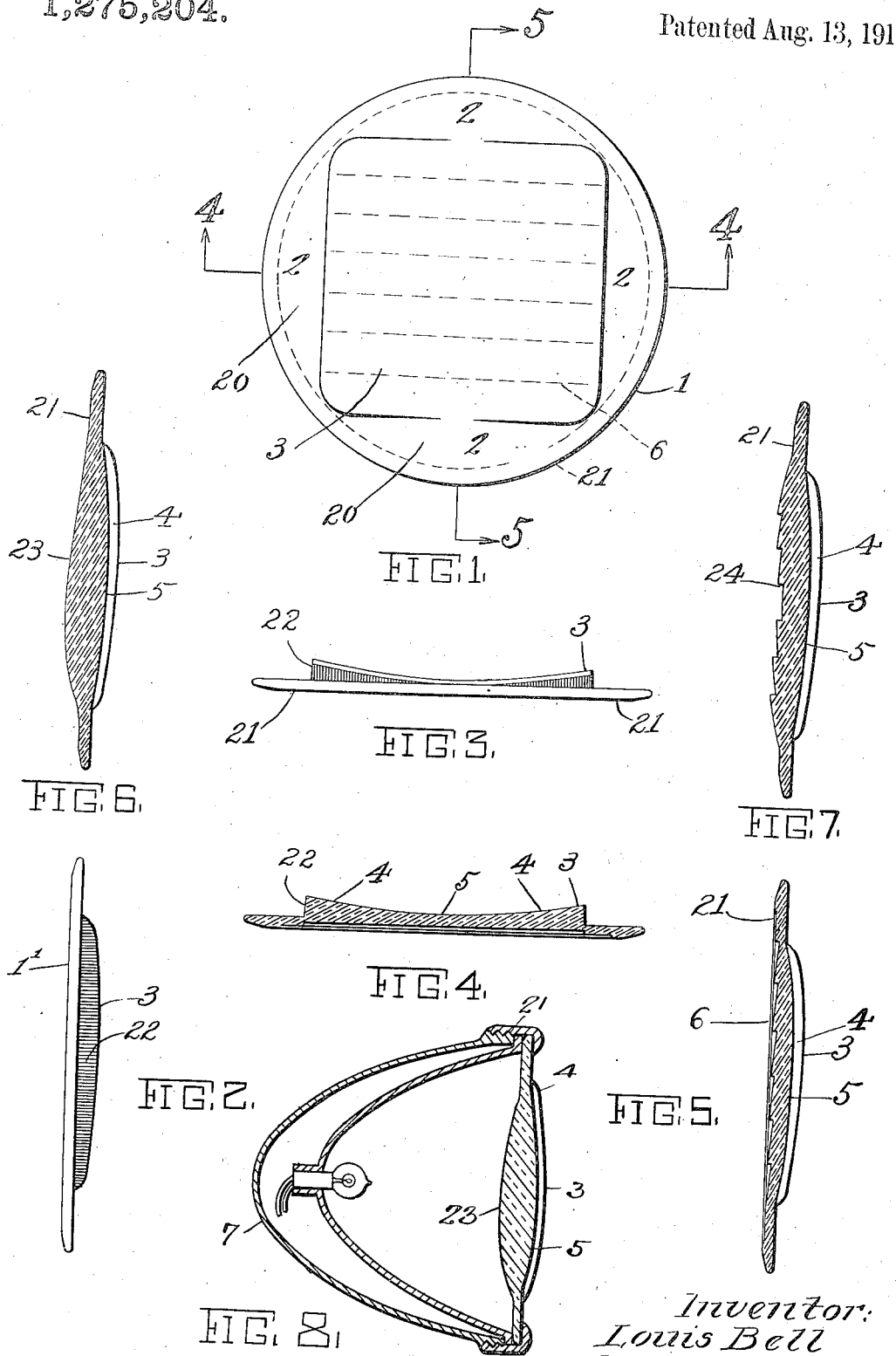

LOUIS BELL, OF NEWTON, MASSACHUSETTS.

ENDOTOROIDAL LENS.

1,275,204.

Specification of Letters Patent. Patented Aug. 13, 1918.

Application filed June 25, 1917. Serial No. 176,702.

*To all whom it may concern:*

Be it known that I, LOUIS BELL, a citizen of the United States, residing at Newton, county of Middlesex, Commonwealth of Massachusetts, have invented certain new and useful Improvements in Endotoroidal Lenses, of which the following is a specification.

The present subject matter has to do with the distribution of light, and particularly with the projection of a beam which will be substantially parallel and avoid in any angular intercept, the conic section usually ingular intercept, the conic section usually incidental to such illumination. As a characteristic illustration and a particular embodiment I shall show and describe a headlight plate of novel formation.

Briefly I accomplish the desired result by embodying in a suitable surface curvatures of crossed axis and of different sign. This surface is, I believe, wholly novel in itself and for the purpose of identification is one which I have termed an endotoroid.

For convenience in visualization I may point out that if for example a slice be cut from such an object as a bicycle tire the outer surface of the slice would be a toroidal surface having two radii of curvature, both plus and crossed at right angles. The inner side of the same slice would show toroidal curvature of negative signs, and at right angles.

If now the inside of the tire be viewed through the opening left by the slice a surface will be seen formed from crossed axes with radii one plus and one minus. In other words the curvature has a convexity when considered peripherally of the tire and a convexity transversely of the tire.

A headlight plate so formed might be considered as having one vertical and one real focus, but in effect the parallel rays are so refracted that the resultant beam of light is compressed in one axis and expanded in the other, so that instead of being thrown to a focal point or expanded uniformly in a cone of light the projecting beam takes the form of a quite sharply defined oblong of which the relative dimensions may be predetermined by the curvature given to the two elements of the endotoroidal surface. This as may be seen will be very advantageous for the purpose of casting a beam of desired contour of intercept with the roadway or in any other form of illumination, as for instance the lighting of an oblong sign or in the flood lighting of a building.

Furthermore, this surface possesses peculiar possibilities of combination for practical results in headlight plates where thickness of glass and especially unsymmetrical thicknesses are to be avoided.

Again the headlight plate in addition to the contouring of the intercept and the compression or expansion of light in either vertical or horizontal axis of the beam may require either addition or supplemental formation which may be secured through a utilization of prismatic or lenticular elements on the other surface plate.

All this may be effected by a proportioning of the several elements in their supplemental relation to each other, so that the resultant effect upon the beam may be secured by a distribution of the optical components of the plate. As above stated, this is very important where the plate is carried, as in the case of a motor vehicle headlight, over rough roads.

As illustrative of my invention I have shown and will describe a form which I have found well adapted to practical use. Throughout specification and drawings, like reference numerals are similarly applied, and in the drawings:—

Figure 1 is a plan view of a headlight lens involving my invention.

Fig. 2 is a lateral edge view of the same.

Fig. 3 is a bottom edge view.

Fig. 4 is a central transverse view on the line 4—4 of Fig. 1.

Fig. 5 is a central vertical sectional view on the line 5—5 of Fig. 1, and

Figs. 6 and 7 are central vertical sections of slightly modified form.

Fig. 8 is a sectional view showing applicant's lens placed in a lamp.

The present headlight lens is peculiar in its embodiment of the endotoroidal front to which I have already referred, which I preferably locate on the front of the lens. This surface is very difficult of illustration, but it will be readily apparent to those skilled in the art by reference to sections 4, 5, 6 and 7.

As will be seen by the vertical sections 5, 6 and 7, the surface has a convexity as indicated by the line 5 and a concavity indicated by the surface line 4 in Fig. 4.

In the embodiment shown, I provide a disk or plate 1¹ of diameter suitable for the lamp front for which it is intended and having marginal portions 20 of uniform thickness and stippled or otherwise roughened upon the rear face indicated at 21. Centrally of the lens and preferably on the front side thereof I form a body portion 3 of general rectangular shape which defines through its margins the lunette portions 2 of the top, bottom and sides of the plate 1.

This portion 3 is raised above the level of the front face of the plate 1 and has its front surface developed as an endotoroid. The endotoroid may be of any desired combination of axial or radial development in the form shown. In the embodiment, the surface is developed from a vertical axis of concavity and horizontal axes of convexity, crossed eccentrically and in the form shown crossed at right angles.

The sides of the raised portion 3 are roughened or otherwise rendered diffusing as indicated at 22. It will be noted that the resultant endotoroid as shown in the section of Fig. 5, exposes a vertical concavity at 4 and a horizontal convexity as indicated at 5. This horizontal convexity is symmetrical in this type of lens, having been developed from a central symmetrical axis, but it will be understood that the axes may be decentered as well as of varied angularity.

In the form of lens shown in Figs. 1 to 5 inclusive the endotoric front is combined with horizontal prisms 6 on the rear face of the plate over the area defined by the raised body 3. These horizontal prisms 6 may be uniform or varied so as to combine with the vertical diffraction of the endotoroid in the desired distribution of the light along the roadway.

In Figs. 6 and 7 I have indicated further modifications by way of illustration.

Fig. 6 indicates a central vertical section of a lens or type similar to that shown in Fig. 1 in which a symmetrical endotoroid similar to that in Fig. 5 is combined with a decentered cylindricity 23 on the rear face formed from horizontal axes.

In Fig. 7 I have indicated a symmetrical endotoroidal front face of the lens corresponding to that shown in Fig. 5 combined with a rear face of horizontal axes developed in Fresnel form as at 24.

These various types are merely employed as illustrating the combinations which may be developed in accordance with my invention. The type of lens may be varied and the structure may be varied, although it has proven to be a form well adapted to the use of my invention and possessing features of advantage in themselves novel.

Various modifications in type, form or in arrangement or disposition of the axes, radii, sines or combinations may be resorted to, all without departing from the spirit of my invention if within the limits of the appended claims.

What I therefore claim and desire to secure by Letters Patent is:—

1. A projecting lens having on one face a composite refracting surface producing the effect of a plus cylinder in one axis, and the effect of a minus cylinder in another axis at an angle thereto, and on its opposite face transverse depressor prisms.

2. A projecting lens having on one face a composite refracting surface producing the effect of a plus cylinder in one axis, and the effect of a minus cylinder in another axis at an angle thereto and on its opposite face transverse depressor prisms of varied function.

3. A projecting lens having on one face in a single surface crossed cylindrical refracting surfaces of opposite signs and on its opposite face transverse depressor prisms.

4. A projecting lens having a refracting surface producing refractions of opposite sign with respect to axes taken at an angle in the same vertical plane and transverse depressor prisms.

5. A refracting lens comprising a substantially plane base portion and a substantially rectangular refracting portion having upon a single surface combined plus and minus cylindrical curvatures of crossed axes.

6. A refracting lens comprising a base portion and a substantially rectangular refracting portion located within the margins thereof and having upon a single surface combined plus and minus cylindrical curvatures of crossed axes.

7. A projecting lens comprising a base portion and a rectangular projecting portion located within the margins thereof and having its face formed as a composite refracting surface of crossed cylindricity of opposite signs, said plate having on its opposite face transverse depressor prisms parallel with one axis of cylindricity.

8. A projecting lens comprising a base portion and a rectangular projecting portion located within the margins thereof and having its face formed as a composite refracting surface of crossed cylindricity of opposite signs, said plate having on its opposite face transverse depressor prisms of variant function parallel with one axis of cylindricity.

9. A projecting lens comprising a base portion and a rectangular projecting portion located within margins thereof, said projecting portion having diffusing surfaces on its edges and having its face formed as a composite refracting surface, said plate having on its opposite face transverse depressor prisms parallel with one axis of cylindricity.

10. A projecting lens comprising a base portion and a rectangular projecting portion located within the margins thereof and having its face formed as a composite refracting surface of crossed cylindricity of opposite signs, said plate having on its opposite face transverse depressor prisms of variant function parallel with one axis of cylindricity.

11. A headlight lens comprising a base portion and a substantially rectangular area set within the margins thereof, said refracting area constituted of plus and minus substantially cylindrical surfaces of horizontal and vertical axes respectively.

12. A projecting lens having on one face a composite refracting surface producing the effect of a plus cylinder in one axis, and the effect of a minus cylinder in another axis at an angle thereto.

13. A projecting lens having on one face a composite refracting surface producing the effect of a plus cylinder in one axis, and the effect of a minus cylinder in another axis at an angle thereto, and transverse depressor prisms.

14. A projecting lens having a substantially rectangular refracting portion with a surface of combined plus and minus cylindrical curvatures of crossed axes substantially perpendicular to the sides of the rectangle.

15. In combination with a headlight having a substantially parabolic reflector, a screen having a substantially rectangular projecting area having refracting elements effectively disposed for light distribution, and in vertical and horizontal directions thereof, to maintain a beam of substantially rectangular cross section.

In testimony whereof I affix my signature in presence of two witnesses.

LOUIS BELL.

Witnesses:
 MARY P. WOTHERSPOON,
 MARION F. WEISS.